Aug. 28, 1945.  W. P. WINTERS  2,383,528
TRANSFER MECHANISM FOR CAN PARTS
Filed March 5, 1943   3 Sheets-Sheet 1

INVENTOR.
William P. Winters
BY Ivan D. Thornburgh
Charles H. Line
ATTORNEYS

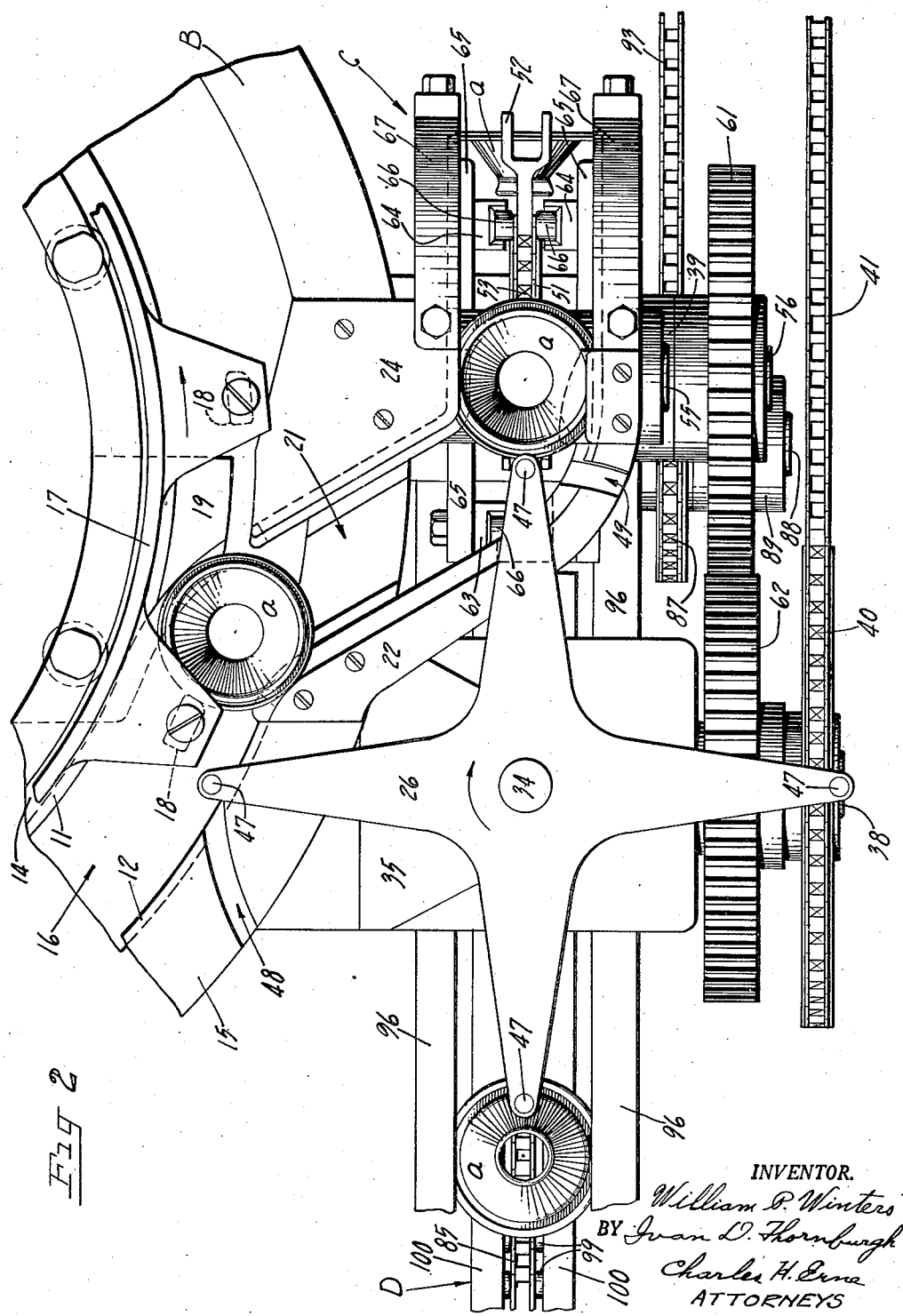

Aug. 28, 1945. W. P. WINTERS 2,383,528
TRANSFER MECHANISM FOR CAN PARTS
Filed March 5, 1943 3 Sheets-Sheet 3
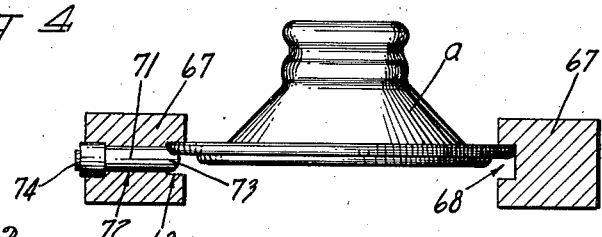
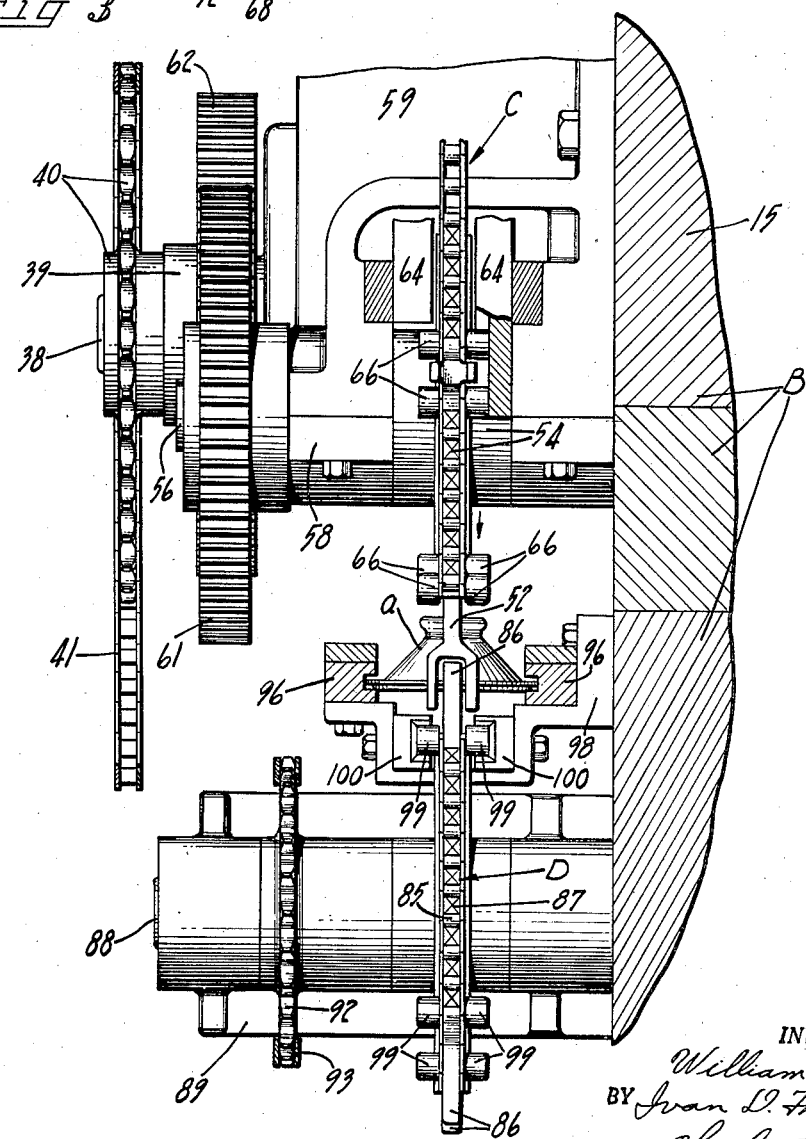
INVENTOR.
William P. Winters
BY Ivan D. Thornburgh
Charles H. Ernr
ATTORNEYS Patented Aug. 28, 1945

2,383,528

UNITED STATES PATENT OFFICE 2,383,528

TRANSFER MECHANISM FOR CAN PARTS

William P. Winters, Cincinnati, Ohio, assignor to American Can Company, New York, N. Y., a corporation of New Jersey Application March 5, 1943, Serial No. 478,149

5 Claims. (Cl. 198—33)

This invention relates generally to conveyor mechanism for can parts and the like and has particular reference to a transfer and turnover conveyor adapted for receiving continuously moving can parts in one position and for delivering them in an inverted position and in synchronism with an auxiliary conveyor.

An object of the invention is the provision of a transfer conveyor which is interposed between can making machines for the transfer of can parts received in one position from one machine for delivery in a different position to an auxiliary conveyor.

Another object is the provision in such a transfer conveyor of devices which operate to restrain any uncontrolled movement of the can parts to insure delivery onto the auxiliary conveyor in timed relation therewith.

Numerous other objects and advantages of the invention will be apparent as it is better understood from the following description, which, taken in connection with the accompanying drawings, discloses a preferred embodiment thereof.

Referring to the drawings:

Fig. 2 is an enlarged top plan view of parts shown in Fig. 1, the view being taken substantially along a horizontal plane indicated by the line 2—2 in Fig. 1, with parts broken away;

Fig. 3 is an enlarged fragmentary sectional view taken substantially along the broken lines 3—3 in Fig. 1; and Fig. 4 is an enlarged detail of the conveyor guides showing the same supporting a can part.

Figure 1:
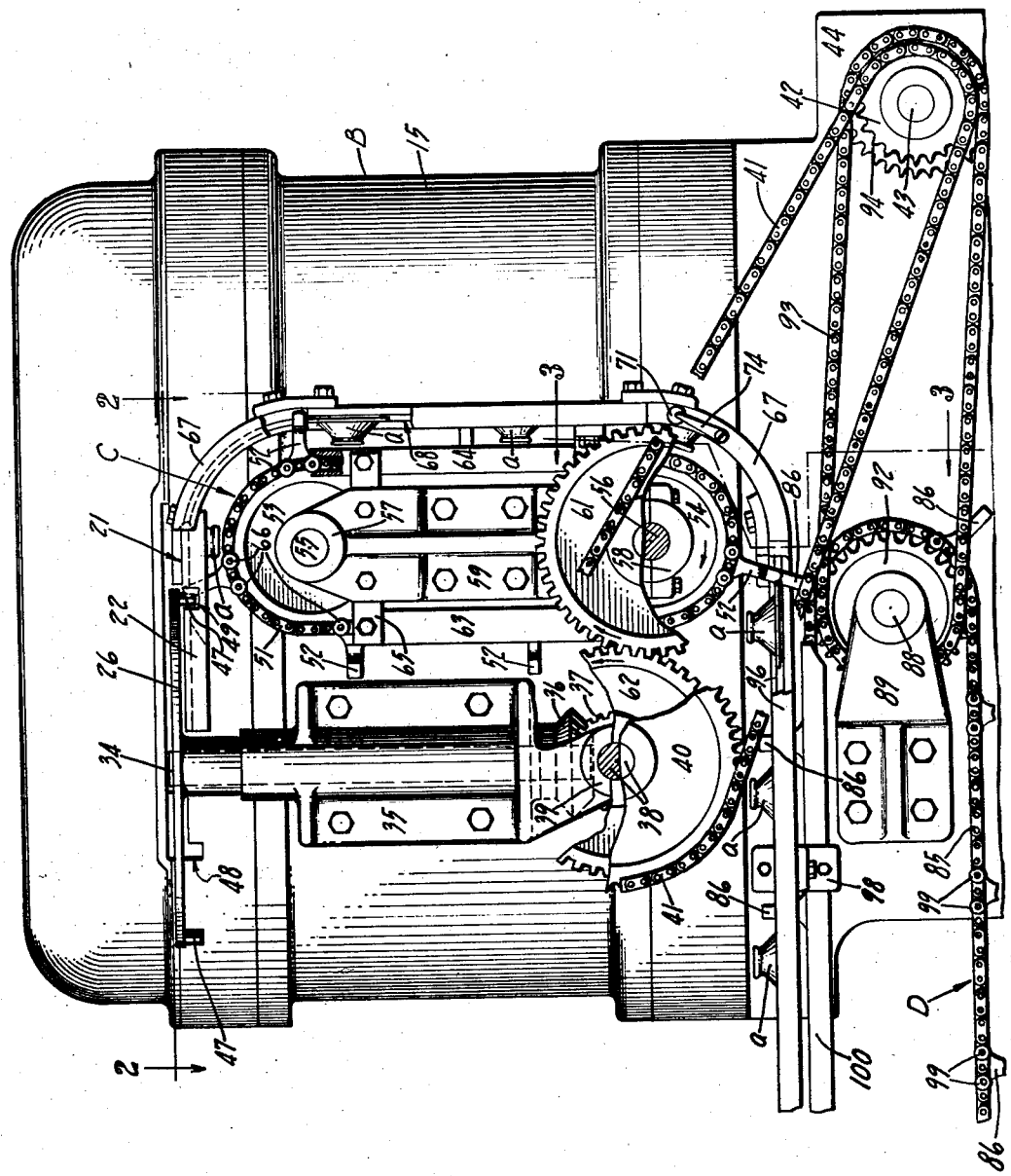
Figure 1 is a front elevation of a transfer conveyor embodying the present invention, the view also showing a portion of a machine with which the conveyor is connected, with parts broken away.

As a preferred embodiment of the invention the drawings illustrate a transfer conveyor mechanism attached to a drying machine B of the character disclosed in United States Patent 1,515,306, issued November 11, 1924, to Gustav W. Hedstrom, although the invention is equally well adapted for use with other kinds of machines. The conveyor mechanism includes a transfer and turn-over conveyor C and an auxiliary conveyor D. The turnover conveyor C receives cone top can ends $a$ in an inverted position from the drying machine B and delivers them in an upright position to the auxiliary conveyor D in timed relation with the operation of the latter conveyor. The auxiliary conveyor carries the can ends to a subsequent operation machine or to any other suitable place of deposit as desired.

In the drying machine above mentioned, the inverted cone top can ends $a$ are propelled along an ascending helical path of travel on cooperating pairs of lifting threads 11, 12 (Fig. 2) which are formed on adjacent inner and outer cylindrical walls of concentric shells 14, 15 which constitute portions of the main frame of the machine. These shells set off between them an annular drying chamber 16. Movement of the can ends through the drying chamber is effected by a continuously rotating member or rotor 17 having depending spaced and parallel propelling rods 18 which travel through the drying chamber and which engage behind and sweep along the can ends.

Adjacent the upper end of the machine, the dried can ends $a$ are discharged from the drying chamber 16 by a curved shoe 19 which is fixed in the path of travel of the can ends. This shoe is secured to the inner shell 14. The curved shoe deflects the can ends into a short horizontal runway 21 which includes a pair of spaced and parallel guide rails 22, 24 secured to the outer shell 15 of the machine. These rails support the can ends and lead them to the turnover conveyor C.

The can ends $a$ received in the runway are propelled therealong in timed order toward the turnover conveyor C by a horizontal star wheel 26 which is mounted on the upper end of a vertical shaft 34 (Figs. 1 and 2) journaled in a bearing bracket 35 bolted to the outer shell 15 of the machine. This shaft is driven by a bevel gear 36 mounted on the lower end of the shaft. The gear 36 meshes with a bevel gear 37 which is carried on a short horizontal shaft 38 journaled in a bearing 39 formed on the bracket 35.

The outer end of the shaft 38 carries a sprocket 40 which is rotated by an endless driving chain 41 which operates over this sprocket. The chain also takes over a driving sprocket 42 mounted on the outer end of a main driving shaft 43 journaled in bearing blocks 44 of the machine B. The driving shaft may be the main power shaft of the machine and may be driven in any suitable manner.

The rotating star wheel 26 has four horizontally extended arms, each of which carries a depending stud 47 at its outer end. These studs sweep through the runway and engage behind a can end traveling at the top of its helical path and propel the can end forward tangentially and into position over the turnover conveyor C. Passageways 48, 49 are provided in the outer shell 15 and in the guide rail 22 for clearance of the moving studs 47.

The transfer or turnover conveyor C is located directly under the can end runway and is disposed in a vertical position. It includes an endless chain 51 (Figs. 1 and 2) having a plurality of forked or bifurcated feed fingers 52 spaced at intervals along its length. The chain operates in a clockwise direction (as viewed in Fig. 1) over a pair of spaced upper and lower sprockets 53, 54 which are mounted on respective shafts 55, 56. These shafts are journaled in bearings 57, 58 formed in a bracket 59 which is bolted to the outer shell 15 of the machine B.

The chain 51 is driven by a spur gear 61 which is mounted on the outer end of the lower sprocket shaft 56. This gear meshes with and is driven by a spur gear 62 which is mounted on and which rotates with the star wheel drive shaft 38. Thus the turnover conveyor C is actuated in time with the star wheel 26.

The chain 51 is guided along its vertical path of travel between the sprockets 53, 54 by vertical track rails 63, 64 (Figs. 1 and 2) which are secured to support bars 65 fastened to the bracket 59. There are four of these rails and they are disposed on opposite sides of each of the two vertical runs of the chain. Guide rollers 66, secured to the chain at places adjacent the feed fingers 52, operate along the track rails and thus retain the chain and its feed fingers in proper position as they travel between the sprockets.

A pair of spaced and parallel can end transfer and turnover guides 67 are disposed adjacent the down-travel run of the conveyor C in spaced relation thereto, as best shown in Fig. 1. The upper and lower ends of these guides curve around the adjacent sprockets 53, 54. The upper curved ends of the guides are bolted to the runway guide rails 22, 24 and constitute a continuation of these rails. The inner surfaces of the guides are formed with longitudinal grooves 68 for the reception of the can ends a.

Hence as a feed finger 52 of the turnover conveyor C travels upwardly over the top of the upper sprocket 53 of the conveyor, the finger engages behind a can end a positioned by the star wheel 26, and pushes it out of the end of the runway 21 and into the upper curved ends of the transfer guides 67. The finger continues to push the can end and thus propels it downwardly along the vertical straight portion of the guides and into and along the lower curved ends of the guides. It is the travel along these transfer guides that turns the can end right side up, as viewed in Fig. 1.

Speed of the conveyor C usually is sufficient to keep the feed finger 52 in engagement with the can end during this down travel. However, to prevent the can end falling by gravity away from the finger and getting out of time, provision is made to avoid uncontrolled movement of the can end through the transfer guides 67.

This control is brought about by a shouldered stop pin or element 71 (Figs. 1 and 4) which is disposed in a horizontal bore 72 formed in one of the lower curved ends of the transfer guides 67. The inner end of the stop pin is formed with a rounded nose 73 which extends into the adjacent groove 68 of the guide. The outer end of the pin has an enlarged head which projects beyond the guide and is maintained under pressure of a flat spring 74 which engages against this end of the pin. The spring is secured to the guide.

Thus should a can end run ahead of its propelling finger 52, it is stopped by the pin 71 as it reaches the lower curved end of the guides 67. The held can end remains at the pin until the propelling finger overtakes the can end and pushes it past the pin and along the remaining curved portion of the guide. The spring 74 yields momentarily as the pin is moved outwardly by the passing can end. In this manner the can end is delivered, in an upright position from the lower curved ends of the guides 67 in proper timed relation and under full control of the turnover conveyor C.

Discharge of a can end from the turn-over conveyor C delivers it in timed relation to the auxiliary conveyor D. The auxiliary conveyor D includes an endless chain 85 having feed fingers 86 secured thereto at spaced intervals along the chain. This chain leads to a subsequent operation machine or to any other suitable place of deposit for the can ends. The machine end of the conveyor operates over a sprocket 87 which is mounted on a short shaft 88 journaled in a bearing bracket 89 bolted to the side of the drying machine B.

The sprocket 87 is rotated by a driven sprocket 92 which is mounted on the short shaft 88 adjacent the sprocket 87. The driven sprocket 92 is actuated by an endless chain 93 which operates over a driving sprocket 94 mounted on the main shaft 43. Through this connection with the main shaft the auxiliary conveyor D is actuated in timed relation with the turnover conveyor C.

The feed fingers 86 of the auxiliary conveyor D engage behind the can ends a as they are delivered from the turnover conveyor C and propel them along a pair of spaced and parallel horizontal delivery guides 96 which form a continuation of the lower curved ends of the vertical transfer guides 67. The horizontal delivery guides 96 are bolted to brackets 98 which are secured to a side of the drying machine B. These guides direct the can ends in an upright position to any suitable place of deposit as above mentioned.

In order to facilitate continuous and smooth transfer of a can end from the turnover conveyor C to the auxiliary conveyor D, the feed fingers 86 of the auxiliary conveyor are formed as single prongs which readily pass between the double prongs of the forked fingers 52 (Fig. 3) of the turnover conveyor C when the two sets of fingers come adjacent each other at the point of transfer of the can end. With such a construction of feed fingers the can end is always engaged by one or the other of the conveyor fingers and is therefore always under control.

The feed fingers 86 of the auxiliary conveyor D are maintained in proper feeding position by rollers 99 which are carried on the conveyor chain 85. These rollers operate in horizontal tracks 100 which are disposed adjacent opposite sides of the upper run of the auxiliary conveyor. These tracks are secured to the guide brackets 98.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a conveyor mechanism for can parts, the combination of stationary guides for directing the parts along a predetermined path of travel, a conveyor operable adjacent said guides and having fingers for receiving and for advancing the can parts by pushing them along said guides in predetermined timed and spaced relation, and a stop element located in the path of travel of said advancing can parts for temporarily stopping a can part which has advanced beyond its propelling finger until its engagement by said finger.

2. In a transfer mechanism for can parts, the combination of stationary transfer guides for directing the can parts along a predetermined path of travel, a transfer conveyor operable adjacent said guides and having spaced forked fingers for receiving the parts in one position and for advancing the parts along said guides to invert them into a different position, a yieldable stop pin element located in one of said guides and projecting into the path of travel of the can parts along the guides for temporarily holding a can part until a said forked finger engages and moves it in timed relation with said conveyor, stationary delivery guides forming a continuation of said transfer guides, and an auxiliary conveyor disposed adjacent said delivery guides and adjacent said transfer conveyor and having auxiliary feed fingers for passing into and through the said forked fingers to engage the inverted can parts, remove them from said forked fingers, and advance them along the path of travel defined by said delivery guides.

3. In a transfer mechanism for conveying, inverting and transferring can parts from one machine to another, the combination of stationary inverting guides for directing the can parts along a predetermined path of travel in which said parts are inverted, means for ejecting the can parts from one of said machines into a position adjacent said guides, a transfer conveyor operable adjacent said guides, an auxiliary conveyor leading to said other machine and having can part propelling fingers thereon, bifurcated fingers on said transfer conveyor for propelling the can parts along said guides into a position for delivery to said auxiliary conveyor, the fingers on said auxiliary conveyor passing between the bifurcated fingers on said transfer conveyor to engage and remove the can parts therefrom, and means for actuating said can part ejecting means, said transfer and said auxiliary conveyors in timed relation to effect a continuous smooth advancement of said can parts.

4. In an article transfer mechanism, the combination of stationary guides adapted to engage lateral portions of articles during passage through the mechanism and to direct the movement of said articles in a predetermined path, transfer means for engaging and pushing each of said articles through said guides and along said path, and resilient means in a said guide adapted to engage a said lateral portion of each article whereby the article is restrained from excessive movement in advance of its said transfer means.

5. In an article transfer mechanism, the combination of a transfer conveyor having forked fingers for receiving the articles while the latter are in one position and for propelling said articles along a predetermined path of travel into an inverted position, and an auxiliary conveyor disposed adjacent said transfer conveyor and having feed fingers operable in synchronism with the said forked fingers of the transfer conveyor, said feed fingers passing between the forks of said first mentioned fingers to engage and strip said articles therefrom to propel the articles along a different path of travel.

WILLIAM P. WINTERS.